United States Patent
Fujita et al.

(10) Patent No.: US 12,270,954 B2
(45) Date of Patent: Apr. 8, 2025

(54) PLASTIC SCINTILLATING FIBER AND ITS MANUFACTURING METHOD

(71) Applicant: KURARAY CO., LTD., Okayama (JP)

(72) Inventors: Katsuhiro Fujita, Niigata (JP); Osamu Shinji, Niigata (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 18/026,015

(22) PCT Filed: Jul. 1, 2021

(86) PCT No.: PCT/JP2021/025026
§ 371 (c)(1),
(2) Date: Mar. 13, 2023

(87) PCT Pub. No.: WO2022/059298
PCT Pub. Date: Mar. 24, 2022

(65) Prior Publication Data
US 2023/0358905 A1 Nov. 9, 2023

(30) Foreign Application Priority Data
Sep. 16, 2020 (JP) .................................. 2020-155285

(51) Int. Cl.
*G01T 3/06* (2006.01)
*G01T 1/20* (2006.01)

(52) U.S. Cl.
CPC ............... *G01T 1/201* (2013.01); *G01T 3/06* (2013.01)

(58) Field of Classification Search
CPC ...... G02B 6/02; G02B 6/02033; G02B 6/036; G02B 6/03616; G01T 1/201; G01T 3/06; B29D 11/00682; B29D 11/00701
See application file for complete search history.

(56) References Cited

U.S. PATENT DOCUMENTS

| 5,308,986 A | 5/1994 | Walker |
| 5,434,415 A | 7/1995 | Terada et al. |
| (Continued) | | |

FOREIGN PATENT DOCUMENTS

| CN | 102183812 A | * | 9/2011 | ............... G02B 6/02 |
| JP | H6-201835 A | | 7/1994 | |
| (Continued) | | | | |

OTHER PUBLICATIONS

ISR for PCT/JP2021/025026, dated Sep. 28, 2021 (w/ translation).
(Continued)

*Primary Examiner* — Daniel Petkovsek
(74) *Attorney, Agent, or Firm* — GREENBLUM & BERNSTEIN, P.L.C.

(57) ABSTRACT

A plastic scintillating fiber includes an organic compound containing an element with a neutron cross section larger than that of hydrogen, and includes: an outermost peripheral layer containing a plastic material that emits scintillation light when it is irradiated with neutron radiation; a core having a high refractive index, disposed inside the outermost peripheral layer, and containing at least one type of fluorescent substance that absorbs the scintillation light and wavelength-converts the absorbed light into light having a wavelength longer than that of the absorbed light; and a cladding layer covering an outer peripheral surface of the core and having a refractive index lower than that of the core. A wavelength shifting fiber including the core and the cladding layer, and the outermost peripheral layer covering an outer peripheral surface of the wavelength shifting fiber are integrally formed.

13 Claims, 6 Drawing Sheets

(56) References Cited

U.S. PATENT DOCUMENTS

| | | | |
|---|---|---|---|
| 7,067,079 | B2 | 6/2006 | Bross et al. |
| 9,482,763 | B2 * | 11/2016 | Vasilyev ................ G01V 5/125 |
| 2012/0280132 | A1 | 11/2012 | Nakamura et al. |
| 2013/0208857 | A1 | 8/2013 | Arodzero et al. |
| 2013/0264482 | A1 | 10/2013 | Yamane et al. |
| 2015/0097122 | A1 | 4/2015 | Nakamura et al. |
| 2016/0259070 | A1 | 9/2016 | Fukuda et al. |
| 2019/0293810 | A1 | 9/2019 | Couture et al. |

FOREIGN PATENT DOCUMENTS

| | | |
|---|---|---|
| JP | H6-317713 A | 11/1994 |
| JP | H9-236669 A | 9/1997 |
| JP | 2011-141239 A | 7/2011 |
| JP | 2012-126854 A | 7/2012 |
| JP | 2015-72227 A | 4/2015 |
| JP | 2015-513075 A | 4/2015 |
| WO | WO 2015/064588 A1 | 5/2015 |

OTHER PUBLICATIONS

Hajagos et al., "High-Z Sensitized Plastic Scintillators: A Review", Advanced Materials, vol. 30, Issue 27, Jul. 5, 2018, pp. 1-13.

Hamel et al., "Plastic scintillators modifications for a selective radiation detection", 4th International Conference on Advancements in Nuclear Instrumentation Measurement Methods and their Applications, May 5, 2016, pp. 1-6.

International Preliminary Report on Patentability issued in PCT/JP2021/025026, dated Mar. 21, 2023, and English translation thereof.

EESR issued in EP Patent Application No. 21868985, Jul. 31, 2024.

Poehlmann D M et al., "Characterization of Gadolinium-loaded Plastic Scintillator for Use as a Neutron Veto", arxiv.org, Cornell University Library, 201 Olin Library Cornell University Ithaca, NY 14853, Dec. 29, 2018 XP080995205.

* cited by examiner

PLASTIC SCINTILLATING FIBER AND ITS MANUFACTURING METHOD

This application is based upon and claims the benefit of priority from Japanese patent application No. 2020-155285, filed on Sep. 16, 2020, the entire disclosure of which is incorporated herein in its entirety by reference.

TECHNICAL FIELD

The present invention relates to a plastic scintillating fiber and its manufacturing method.

BACKGROUND ART

A conventional plastic scintillating fiber (PSF) is a plastic fiber in which the outer peripheral surface of a core, which serves as a scintillator, is covered with a cladding layer having a refractive index lower than that of the core, and is mainly used for the detection of radiation. The core is typically made of, for example, a polymeric material in which an organic fluorescent substance is added to a base material having an aromatic ring such as polystyrene or polyvinyl toluene. The cladding layer is made of a polymeric material having a low refractive index such as polymethyl methacrylate or fluorine-containing polymethyl methacrylate.

The principle based on which radiation is detected by using a plastic scintillating fiber will be explained. The base material of the core of the scintillating fiber has an aromatic ring. When applied radiation travels across the scintillating fiber, part of its energy is absorbed by the re-emission of secondary particles and the like inside the core and emitted as ultraviolet light. When no fluorescent substance is added to the core base material, the ultraviolet light is self-absorbed by the core base material itself, so that the ultraviolet light disappears without being transmitted inside the core.

In the plastic scintillating fiber, the ultraviolet light is absorbed by the fluorescent substance added to the core base material, and light having a wavelength longer than that of the absorbed light is re-emitted. Therefore, by selecting an appropriate fluorescent substance, the ultraviolet light is converted into light having a longer wavelength such as blue light, which is less likely to be self-absorbed by the core base material, and the light having the longer wavelength is transmitted inside the fiber. The light that has been transmitted inside the fiber is detected by a detector connected to one of or both ends of the fiber.

As described above, the scintillating fiber has two functions which are emitting light associated with the detection of radiation and transmitting the light. Therefore, the scintillating fiber is used for calculating a place at which a radiation passes and an amount of the radiation, for example. In such a scintillating fiber, it is important that how ultraviolet light emitted from a core should be efficiently wavelength-converted into light having a wavelength longer than that of the emitted ultraviolet light in order to transmit the light over a long distance.

Meanwhile, besides the scintillating fibers, plastic wavelength shifting fibers (WLSF) are also widely used. Wavelength shifting fibers are used, for example, in combination with plastic scintillators that emit blue light. A groove or hole is formed in a plate-like or rod-like plastic scintillator, and a wavelength shifting fiber, which absorbs blue light and converts the absorbed light into green light, is embedded in the groove or hole of the plastic scintillator.

In the case of a large detector having a large area, in some cases, it is difficult to transmit light from each of scintillators to an external photoelectric detector (e.g., a photomultiplier tube) located distant from the scintillator due to the attenuation of the light and/or the spatial constraint. In such a case, a wavelength shifting fiber that is thin, is easily bent, and is capable of transmitting light over a long distance is suitably used. It is possible to freely lay out a large number of wavelength shifting fibers up to the external photoelectric detector.

The core of the wavelength shifting fiber is made of polystyrene resin or a polymethyl methacrylate resin, in which a fluorescent substance for shifting a wavelength is dissolved. In the wavelength shifting fiber, scintillation light that enters therein from an external scintillator is absorbed by the fluorescent substance contained in the core, and is efficiently wavelength-converted. Further, the wavelength-converted light is transmitted inside the fiber. The scintillator which is combined with the wavelength shifting fiber is not limited to the plastic scintillators, and inorganic scintillators or the like that are highly sensitive to neutrons can also be used.

As described above, by using the wavelength shifting fiber, scintillation light emitted from large-area or long scintillators or special scintillators such as those for detecting neutrons can be easily concentrated. Further, the light, whose wavelength has been shifted by the core, can be transmitted by the wavelength shifting fiber, and such wavelength shifting fibers can be freely connected to one another up to the photoelectric detector.

Note that, for the detection of neutron radiation, since the sensitivity of plastic scintillators made solely of plastics is low, it is difficult to detect such radiation by using such plastic scintillators. Therefore, for example, inorganic scintillators are used. Examples of the inorganic scintillators include, among others, LiF/ZnS:Ag, LiI:$Eu^{2+}$, LiBaF$_3$:$Ce^{3+}$, LiCaAlF$_6$:$Ce^{3+}$, and Li$_2$B$_4$O$_7$:$Cu^+$, as well as those disclosed in Patent Literature 1.

However, the attenuation lengths of inorganic scintillators are in the order of several millimeters and hence they are not highly transparent. That is, they cannot transmit emitted light (i.e., scintillation light) over a long distance. Further, due to the constraint in regard to the crystal size, it is difficult to transmit light to the photoelectric detector by using inorganic scintillators.

Further, as disclosed in Patent Literatures 2 and 3 etc., a sheet in which fine particles obtained by crushing an inorganic scintillator are dispersed in a transparent resin has been developed as a sheet for detecting neutron radiation. In such a sheet, the difference between the refractive index of the inorganic scintillator and that of the transparent resin is so large that the transparency cannot be ensured and hence the sheet itself cannot efficiently transmit light to the photoelectric detector.

Therefore, for example, in Patent Literatures 2, 3 and 4, a wavelength shifting fiber is placed along the end face or the surface of the scintillator, and light is transmitted to the photoelectric detector through the wavelength shifting fiber. By using the wavelength shifting fiber, the detection light can be transmitted over a longer distance.

Note that, in all of the Patent Literatures 2, 3 and 4, in particular, in the detection in which the spatial resolution is considered important, such as the image detection disclosed in Patent Literature 3, a large number of post-processing steps are required in order to combine scintillators with wavelength shifting fibers.

CITATION LIST

Patent Literature

Patent Literature 1: Japanese Unexamined Patent Application Publication No. 2012-126854
Patent Literature 2: International Patent Publication No. WO2015/064588
Patent Literature 3: Japanese Unexamined Patent Application Publication No. 2011-141239
Patent Literature 4: Japanese Unexamined Patent Application Publication No. 2015-72227

SUMMARY OF INVENTION

Technical Problem

In a conventional plastic scintillating fiber, the core needs to be highly transparent so that the core itself emits scintillation light and transmits the emitted scintillation light to the photoelectric detector. Therefore, it is impossible to obtain a plastic scintillating fiber for detecting neutron radiation by adding a material that emits scintillation light when it is irradiated with neutron radiation.

Similarly, in a wavelength shifting fiber, the core also needs to be highly transparent in order to wavelength-convert scintillation light emitted from an external scintillator in the core and transmit the wavelength-converted light through the core. Therefore, it is impossible to obtain a plastic scintillating fiber for detecting neutron radiation by adding a material that emits scintillation light when it is irradiated with neutron radiation.

Meanwhile, in the case of a conventional scintillation detector using wavelength shifting fibers, the post-processing for combining scintillators with wavelength shifting fibers is required. Further, in the case of performing image detection, scintillators needs to be separated and combined one by one for each of a large number of wavelength shifting fibers, thus making the processing thereof significantly difficult.

The present invention has been made in view of the above-described circumstances, and an object thereof is to provide a plastic scintillating fiber by which neutron radiation can be detected, and of which the productivity is excellent.

Solution to Problem

A plastic scintillating fiber according to an aspect of the present invention includes:
an outermost peripheral layer containing a plastic material that contains an organic compound containing an element with a neutron cross section larger than that of hydrogen and that emits scintillation light when it is irradiated with neutron radiation;
a core having a high refractive index, disposed inside the outermost peripheral layer, and containing at least one type of fluorescent substance that absorbs the scintillation light and wavelength-converts the absorbed light into light having a wavelength longer than that of the absorbed light; and
a cladding layer covering an outer peripheral surface of the core and having a refractive index lower than that of the core, in which
a wavelength shifting fiber including the core and the cladding layer, and the outermost peripheral layer covering an outer peripheral surface of the wavelength shifting fiber are integrally formed.

In the plastic scintillating fiber according to the present invention, the outermost peripheral layer contains an organic compound containing an element with a neutron cross section larger than that of hydrogen, and contains a plastic material that emits scintillation light when it is irradiated with neutron radiation. Therefore, the sensitivity to neutrons is more improved compared to an ordinary plastic scintillating fiber.

When it is irradiated with neutrons, elements such as lithium 6, boron 10, and gadolinium, which have neutron cross sections higher than hydrogen, emit much more radiation than elements such as carbon, oxygen, and hydrogen, which constitute ordinary plastic scintillators. In the plastic scintillating fiber of the present invention, such radiation is generated in the plastic material constituting the outermost peripheral layer, and the radiation generates scintillation light. By the above-described mechanism, neutron radiation can be detected with high sensitivity. Further, unlike the core, the outermost peripheral layer does not require high transparency required for transmitting light, and therefore the above organic compound can be added at a high concentration.

Further, in the plastic scintillating fiber according to an aspect of the present invention, the core disposed inside the outermost peripheral layer absorbs the scintillation light emitted from the outermost peripheral layer, wavelength-converts the absorbed light, and transmits the wavelength-converted light. Therefore, neutron radiation, for which the sensitivity of conventional plastic scintillating fibers is low and hence which could not be easily detected by using such plastic scintillators, can be detected. Further, the wavelength shifting fiber including the core and the cladding layer, and the outermost peripheral layer covering the outer peripheral surface of the wavelength shifting fiber are integrally formed, thus making the post-processing, which is required to combine a scintillator and a wavelength shifting fiber in the conventional technology, unnecessary. That is, it is possible to provide a plastic scintillating fiber by which neutron radiation can be detected, and of which the productivity is excellent.

The outermost peripheral layer may contain at least one type of fluorescent substance that absorbs the scintillation light and wavelength-converts the absorbed light into light having a wavelength longer than that of the absorbed light.

The organic compound may contain lithium 6.

Alternatively, the organic compound may contain boron 10. Note that the organic compound may be a carborane-based compound. The carborane-based compound has a high ratio of boron in its molecular weight, and allows efficient addition of boron 10 element. Further, the ratio of boron in the molecular weight of the organic compound may be 50% or more. By the above-described configuration, boron 10 can be contained at a high concentration, resulting in high neutron reactivity.

Alternatively, the organic compound may contain gadolinium.

Further, the wavelength shifting fiber and the outermost peripheral layer may be integrally formed through a drawing process. The productivity is further improved.

Outside the outermost peripheral layer, a protective layer that protects the outermost peripheral layer may be integrally formed. This improves durability and the like.

Further, the cladding layer may have a multi-cladding structure including an inner cladding layer, and an outer cladding layer covering an outer peripheral surface of the inner cladding layer and having a refractive index lower than that of the inner cladding layer. The total reflection angle becomes wider, so that more intense light is obtained.

A reflective layer may be provided outside the outermost peripheral layer or the protective layer. The scintillation light emitted in the outermost peripheral layer and the light whose wavelength has been shifted in the core are reflected in the reflective layer to be unlikely to leak outside from the side surface of the fiber, resulting in intense light.

The reflective film may be a metal film. By the above-described configuration, a high reflectance can be obtained with a small thickness.

A method for manufacturing a plastic scintillating fiber according to an aspect of the present invention is a method for manufacturing a plastic scintillating fiber, the plastic scintillating fiber including:
an outermost peripheral layer containing a plastic material that contains an organic compound containing an element with a neutron cross section larger than that of hydrogen and that emits scintillation light when it is irradiated with neutron radiation;
a core having a high refractive index, disposed inside the outermost peripheral layer, and containing at least one type of fluorescent substance that absorbs the scintillation light and wavelength-converts the absorbed light into light having a wavelength longer than that of the absorbed light; and
a cladding layer covering an outer peripheral surface of the core and having a refractive index lower than that of the core, and
the method including:
a process of manufacturing a preform by inserting a second cylindrical body for the cladding layer into a first cylindrical body for the outermost peripheral layer, and inserting a rod for the core into the second cylindrical body; and
a process of drawing the preform while heating the preform.

A method for manufacturing a plastic scintillating fiber according to an aspect of the present invention is a method for manufacturing a plastic scintillating fiber, the plastic scintillating fiber including:
an outermost peripheral layer containing a plastic material that contains an organic compound containing an element with a neutron cross section larger than that of hydrogen and that emits scintillation light when it is irradiated with neutron radiation;
a core having a high refractive index, disposed inside the outermost peripheral layer, and containing at least one type of fluorescent substance that absorbs the scintillation light and wavelength-converts the absorbed light into light having a wavelength longer than that of the absorbed light; and
a cladding layer covering an outer peripheral surface of the core and having a refractive index lower than that of the core, and
the method including:
coating the outermost peripheral layer on a surface of a wavelength shifting fiber containing the core and the cladding layer.

Advantageous Effects of Invention

According to the present invention, it is possible to provide a plastic scintillating fiber by which neutron radiation can be detected with higher sensitivity than a conventional scintillating fiber, and of which the productivity is excellent.

DESCRIPTION OF EMBODIMENTS

Specific embodiments according to the present invention will be described hereinafter with reference to the drawings. However, the present invention is not limited to the below-shown embodiments. Further, for clarifying the explanation, the following description and drawings are simplified as appropriate.

First Embodiment

<Structure of Plastic Scintillating Fiber>

Figure 1:
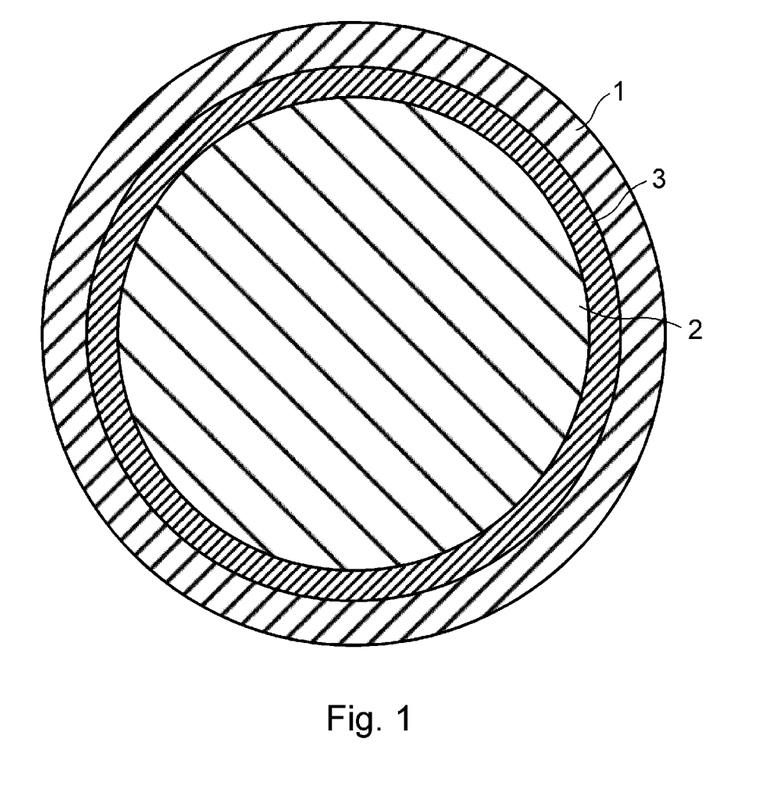
FIG. 1 is a cross-sectional diagram of a plastic scintillating fiber according to a first embodiment.

A plastic scintillating fiber according to a first embodiment of the present invention will be described with reference to FIG. 1. FIG. 1 is a cross-sectional diagram of the plastic scintillating fiber according to the first embodiment.

As shown in FIG. 1, the plastic scintillating fiber according to the first embodiment includes an outermost peripheral layer 1, a core 2, and a cladding layer 3.

The outermost peripheral layer 1 is made of a plastic material that emits scintillation light when it is irradiated with neutron radiation. Then, the plastic material contains an organic compound containing an element with a neutron cross section larger than that of hydrogen. Further, in addition to the organic compound containing the element with a neutron cross section larger than that of hydrogen, the plastic material may contain fluorescent substance that absorbs the scintillation light generated from the plastic material and wavelength-converts the absorbed light into light having a wavelength longer than that of the absorbed light.

The outermost peripheral layer 1 preferably sufficiently emits light and is sufficiently transparent to allow the scintillation light to pass through the cladding layer 3 and enter the core 2 located at the center of the fiber. Further, the outermost peripheral layer 1 does not necessarily need to be highly transparent, but is preferably as transparent as possible. The thickness of the outermost peripheral layer may be increased to obtain the required sensitivity to neutrons. Even if the transparency of the outermost peripheral layer 1, which is the scintillator layer, is low, it is possible to transmit light over a long distance as long as the core 2 which transmits the light at the center of the fiber is highly transparent.

The core 2 is disposed inside the outermost peripheral layer 1, and is made of a transparent resin having a high refractive index and containing at least one type of fluorescent substance that absorbs scintillation light generated in the outermost peripheral layer 1 and converts the absorbed light into light having a wavelength longer than that of the absorbed light. The refractive index of the transparent resin of which the core 2 is made is preferably 1.5 or higher.

The cladding layer 3 covers the outer peripheral surface of the core 2 and is made of a transparent resin having a refractive index lower than that of the core 2. Note that the wavelength shifting fiber composed of the core 2 and the cladding layer 3, and the outermost peripheral layer 1 covering the outer peripheral surface of the wavelength shifting fiber are integrally formed.

In order to make the wavelength shifting fiber function as an optical fiber and transmit light over a long distance, the transparency of the cladding layer 3 is as important as the transparency of the core 2. For the long-distance transmission, the transparency of the outermost peripheral layer 1 is not so important.

In order to make the wavelength shifting fiber function as an optical fiber and transmit light over a long distance, the thickness of the cladding layer 3 is preferably from 3 μm to 100 μm, which is sufficiently thicker than the depth of evanescent waves that seeps out from the core 2 into the cladding layer 3. When the thickness of the cladding layer 3 is sufficiently thicker than the depth of the evanescent waves seeping into the cladding layer 3, the cladding layer 3 and the outermost peripheral layer 1 can be made of materials having equivalent refractive indices, or can even be made of the same transparent resin.

As for the fluorescent substance contained in the core 2, it is desirable that the absorption spectrum match the wavelength of the scintillation light generated in the outermost peripheral layer 1, and that the fluorescence spectrum, to which the absorption spectrum is shifted, be as far away from the absorption spectrum as possible. Further, the core 2 may also contain a second fluorescent substance for additional wavelength shifting in order to, for example, conform the shifted wavelength to the wavelength at which the photoelectric detector, such as a photomultiplier tube (PMT) or avalanche photodiode (APD), has good sensitivity. Note that details of the fluorescent substance will be described later.

In the plastic scintillating fiber according to the first embodiment, scintillation light is generated in the outermost peripheral layer 1 when the plastic scintillating fiber is irradiated with neutron radiation. Further, the core 2 disposed inside the outermost peripheral layer absorbs the scintillation light, wavelength-converts the absorbed light, and transmits the wavelength-converted light. Therefore, neutron radiation, for which the sensitivity of conventional plastic scintillating fibers is low and hence which could not be easily detected by using such plastic scintillators, can be detected with high sensitivity. That is, the plastic scintillating fiber according to the first embodiment is a composite-type plastic optical fiber having both the scintillation function for neutron radiation and the wavelength shifting function.

Further, the wavelength shifting fiber composed of the core 2 and the cladding layer 3, and the outermost peripheral layer 1 covering the outer peripheral surface of the wavelength shifting fiber are integrally formed. Therefore, there is no need for the post-processing, which is required to combine a scintillator and a wavelength shifting fiber in the conventional technology. Further, the productivity is significantly improved and the costs are reduced as compared to the conventional technology.

Note that, outside the outermost peripheral layer 1, a protective layer that protects the outermost peripheral layer (not shown) may be integrally formed. The protective layer improves the durability and the like of the plastic scintillating fiber.

<Modified Example of Plastic Scintillating Fiber>

Figure 2:
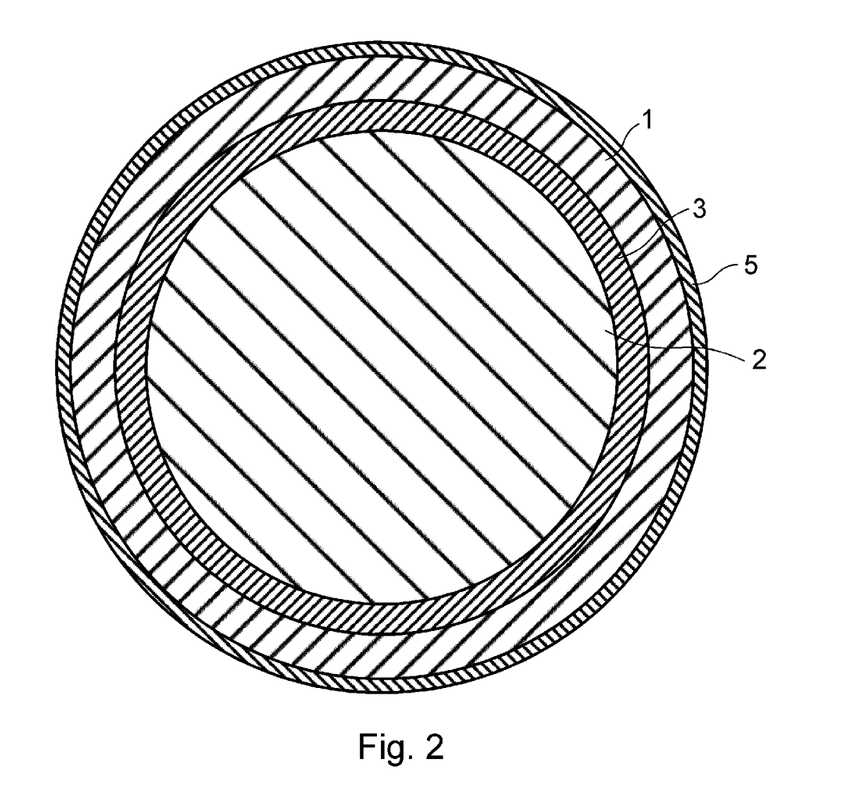
FIG. 2 is a cross-sectional diagram of a plastic scintillating fiber according to a modified example of the first embodiment.

FIG. 2 is a cross-sectional diagram of a plastic scintillating fiber according to a modified example of the first embodiment. As shown in FIG. 2, a reflective layer 5 may be provided on the surface of the outermost peripheral layer 1 or the protective layer. The scintillation light emitted in the outermost peripheral layer 1 and the light whose wavelength has been shifted in the core 2 are reflected in the reflective layer 5 to be unlikely to leak outside from the side surface of the fiber, resulting in intense light. Note that, by setting the reflective layer 5 to a metal film, a high reflectance can be preferably obtained with a small thickness.

Figure 3:
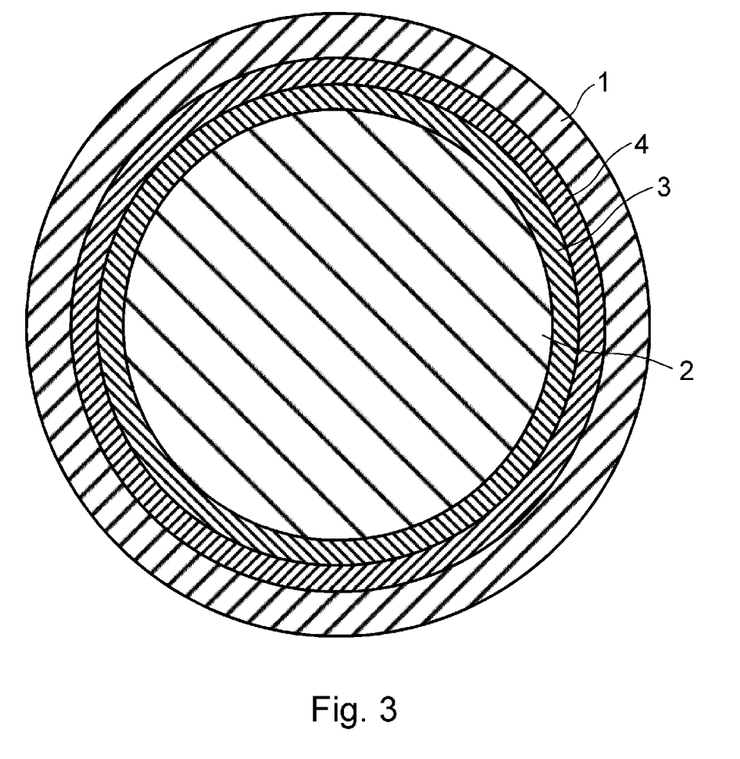
FIG. 3 is a cross-sectional diagram of a plastic scintillating fiber according to another modified example of the first embodiment.

FIG. 3 is a cross-sectional diagram of a plastic scintillating fiber according to another modified example of the first embodiment. In the plastic scintillating fiber according to another modified example, the cladding layer 3 is provided as an inner cladding layer, and an additional cladding layer 4 is provided as an outer cladding layer. That is, the cladding layer has a multi-cladding structure including an inner cladding layer (the cladding layer 3) and an outer cladding layer (the cladding layer 4). The cladding layer 4 covers the outer peripheral surface of the cladding layer 3 and is made of a transparent resin having a refractive index lower than that of the cladding layer 3.

Note that re-emitted light, which has been wavelength-converted in the core 2, is isotropically radiated in a solid angle manner in the core 2. Therefore, only the light that is within the total reflection angle, which is determined based on the difference between the refractive index of the core 2 and that of the cladding layer 3 or 4 can be transmitted in the direction of the fiber. Since the plastic scintillating fiber according to another modified example includes the cladding layer 4 having a low refractive index in addition to the cladding layer 3, its total reflection angle becomes wider (the aperture NA becomes larger) than that of the plastic scintillating fiber shown in FIG. 1, so that more intense light is obtained.

<Material for Outermost Peripheral Layer 1>

The outermost peripheral layer 1, which is a scintillator layer, is made of a transparent resin, that is, plastic material that emits scintillation light when it is irradiated with neutron radiation. Note that, the transparent resin contains an organic compound containing an element with a neutron cross section larger than that of hydrogen.

The transparent resin of which the outermost peripheral layer 1 is made is preferably thermoplastic so that it can be drawn into a thin thread by heating. Preferred examples of such transparent resins include homo-polymers and copolymers composed of any of methacrylic acid ester monomers typified by methyl methacrylate or the like, acrylic ester monomers typified by methyl acrylate, and aromatic monomers having vinyl groups typified by styrene.

Note that, the transparent resin may contain fluorescent substance that emits scintillation light by radiation, or the transparent resin itself may emit scintillation light by radiation. As a transparent resin that itself emits scintillation light by radiation, a homopolymer or copolymer composed of any one of vinyl group-containing aromatic monomers typified by styrene is suitable.

It is desirable that an organic compound containing an element with a neutron cross section larger than that of hydrogen is stable and highly soluble in an aromatic monomer having a vinyl group typified by styrene (that is, a monomer that is a raw material for the transparent resin). If the solubility is high, a polymer obtained by dissolving an organic compound in an aromatic monomer and polymerizing it has high transparency. If the solubility is low, the organic compound is not uniformly dispersed in the transparent resin, causing problems such as variations in sensitivity to neutrons. Further, when it is dispersed as powder, drawing by heating becomes difficult.

Lithium 6, boron 10, and gadolinium are examples of elements having a neutron cross section larger than that of hydrogen.

As the organic compound containing lithium 6, lithium carboxylates such as lithium methacrylate, lithium phenylsalicylate, and lithium pivalate are preferably used.

As the organic compound containing boron 10, carborane-based compounds such as o-carborane, m-carborane, p-carborane, and derivatives thereof are preferably used. The carborane compound ($B_{10}C_2H_{12}$) has a high ratio of boron in its molecular weight, and allows efficient addition of boron 10 element. Note that, when the ratio of the total atomic weight of boron in the molecular weight is 50 mass % or more, boron 10 can be contained at a high concentration, resulting in high neutron reactivity.

As the organic compound containing gadolinium, gadolinium alkoxides such as gadolinium isopropoxide, and gadolinium complexes such as tris(2,2,6,6-tetramethyl-3,5-heptanedionate) gadolinium are preferably used.

The wavelength shifting fluorescent substance contained in the outermost peripheral layer 1 is preferably an organic fluorescent substance having an aromatic ring and having a structure capable of resonating, and is preferably monomolecularly dissolved in the core 2. Typical examples of the fluorescent substance include 2-(4-t-butylphenyl)-5-(4-biphenyl)-1,3,4-oxadiazole (b-PBD), 2-(4-biphenyl)-5-phenyl-1,3,4-oxadiazole (PBD), para-terphenyl (PTP), para-quarterphenyl (PQP), 2,5-diphenyloxazole (PPO), 1-phenyl-3-(2,4,6-trimethylphenyl)-2-pyrazoline (PMP), and 3-hydroxyflavone (3HF) all of which absorb light having a wavelength of 250 to 350 nm.

Further, examples also include 4,4'-bis-(2,5-dimethylstyryl)-diphenyl (BDB), 2,5-bis-(5-t-butyl-benzoxazoyl)-thiophene (BBOT), 1,4-bis-(2-(5-phenyloxazolyl))benzene (POPOP), 1,4-bis-(4-methyl-5-phenyl-2-oxazolyl)benzene (DMPOPOP), 1,4-diphenyl-1,3-butadiene (DPB), and 1,6-diphenyl-1,3,5-hexatriene (DPH) all of which absorb light having a wavelength of 350 to 400 nm.

Examples of the outermost peripheral layer 1 include polystyrene containing lithium pivalate as an organic compound containing an element with a neutron cross section larger than that of hydrogen, and containing fluorescent substance that wavelength-converts scintillation light generated from polystyrene into light having a longer wavelength. About 7.5% of lithium contained in lithium pivalate is lithium 6. Lithium 6 generates alpha radiation by neutron radiation. This alpha radiation causes polystyrene to emit scintillation light, and the fluorescent substance absorbs the scintillation light, wavelength-converts the absorbed light into light having a wavelength longer than that of the absorbed light, and emits light. This outermost peripheral layer 1 emits visible light having a wavelength of 400 to 500 nm by neutron radiation.

Another example of the outermost peripheral layer 1 includes polystyrene containing a carborane-based compound containing a high ratio of boron as an organic compound containing an element with a neutron cross section larger than that of hydrogen, and containing fluorescent substance that wavelength-converts scintillation light of polystyrene into light having a longer wavelength. About 19.8% of the boron contained in the carborane-based compound is boron 10, which has a much larger neutron cross section than that of hydrogen. Boron 10 generates alpha radiation by neutron radiation. This alpha radiation causes polystyrene to emit scintillation light, and the fluorescent substance absorbs the scintillation light, wavelength-converts the absorbed light into light having a wavelength longer than that of the absorbed light, and emits light. The outermost peripheral layer 1 emits, as the scintillation light, ultraviolet light having a wavelength of 350 to 400 nm by neutron radiation.

Note that, the types of the organic compound, the plastic material (transparent resin), and the fluorescent substance that have a neutron cross section larger than that of hydrogen are not limited to the above. Further, the blending and the concentration of the above substance are also selected as appropriate according to the degree of difficulty of the manufacturing, and is not limited to the above-described examples.

<Material for Core 2>

There are no restrictions on the material used for the core 2 as long as the material is a transparent resin. Among them, a homo-polymer or a copolymer composed of any of methacrylic acid ester monomers typified by methyl methacrylate, acrylic ester monomers typified by methyl acrylate, and aromatic monomers having vinyl groups typified by styrene is preferred.

Among them, a copolymer composed of an aromatic monomer having a vinyl group is preferred because it has a high refractive index. The difference between the refractive index of the core 2 and that of the cladding layer 3 increases, so that the total reflection angle becomes wider. That is, of the whole light whose wavelength has been shifted inside the core 2, the light emitted in a wider angle can be transmitted, thus making it possible to obtain a scintillating fiber capable of outputting more intense light.

The wavelength shifting fluorescent substance contained in the core 2 is preferably an organic fluorescent substance having an aromatic ring and having a structure capable of resonating, and is preferably monomolecularly dissolved in the core 2. Typical examples of the fluorescent substance include 2-(4-t-butylphenyl)-5-(4-biphenyl)-1,3,4-oxadiazole (b-PBD), 2-(4-biphenyl)-5-phenyl-1,3,4-oxadiazole (PBD), para-terphenyl (PTP), para-quarterphenyl (PQP), 2,5-diphenyloxazole (PPO), 1-phenyl-3-(2,4,6-trimethylphenyl)-2-pyrazoline (PMP), and 3-hydroxyflavone (3HF) all of which absorb light having a wavelength of 250 to 350 nm.

Further, preferable examples also include 4,4'-bis-(2,5-dimethylstyryl)-diphenyl (BDB), 2,5-bis-(5-t-butyl-benzoxazoyl)-thiophene (BBOT), 1,4-bis-(2-(5-phenyloxazolyl))benzene (POPOP), 1,4-bis-(4-methyl-5-phenyl-2-oxazolyl)benzene (DMPOPOP), 1,4-diphenyl-1,3-butadiene (DPB), and 1,6-diphenyl-1,3,5-hexatriene (DPH) all of which absorb light having a wavelength of 350 to 400 nm.

To obtain intense light, it is preferred that the overlap between the absorption spectrum of the wavelength-shifting fluorescent substance contained in the core 2 and the emission spectrum of the fluorescent substance contained in the outermost peripheral layer 1 be large.

Only one of the aforementioned wavelength-shifting fluorescent substances may be used, or a plurality of wavelength-shifting fluorescent substances may be used in combination. For each wavelength-shifting fluorescent substance, it is preferred that a quantum yield be high and the overlap between the absorption and emission spectra be small (the Stokes shift be large). As a characteristic of plastic fibers, the longer the wavelength is, the smaller the transmission loss of visible light becomes. Therefore, a wavelength-shifting fluorescent substance that emits light having a longer wavelength is preferred, and two or more types of wavelength-shifting fluorescent substances may be used as appropriate in combination. The wavelength-shifting fluorescent substance is preferably soluble in the transparent resin of which the core 2 is made.

The concentration of the wavelength-shifting fluorescent substance is preferably 50 to 10,000 ppm as expressed in mass concentration, and more preferably 100 to 1,000 ppm, irrespective of whether only one wavelength-shifting fluorescent substance is used or a plurality of wavelength-shifting fluorescent substances are used. If the concentration is too low, the scintillation light emitted from the outermost peripheral layer 1 cannot be efficiently absorbed in the core 2. On the other hand, if the concentration is too high, the effect of the self-absorption of the fluorescent substance itself will increase. Therefore, the efficiency of the wavelength shifting decreases and/or the transmittance for the converted light decreases, so that the attenuation length deteriorates.

<Material for Cladding Layer 3>

There are no restrictions on the material used for the cladding layer 3 as long as the material is a transparent resin having a refractive index lower than that of the core 2. Among them, a homo-polymer or a copolymer composed of any of methacrylate ester monomers typified by methyl methacrylate and fluorinated monomers such as perfluoroalkyl methacrylate, or any of acrylate ester monomers typified by methyl acrylate and fluorinated monomers such as perfluoroalkyl acrylate is suitable.

<Material for Cladding Layer 4>

Any transparent resin having a refractive index even lower than that of the cladding layer 3 may be used as the material for the cladding layer 4. The material for the cladding layer 4 can be selected from the monomers for the cladding layer 3 and the like. In particular, it is preferred to select the material from fluorine-containing monomers having a low refractive index.

Regarding these monomers, a polymer or a copolymer can be easily obtained by heat or light irradiation. Therefore, they are advantageous because it is possible to form a precise distribution of compositions, and they can be easily handled. In the polymerization, an organic peroxide or an azo compound may be added as a polymerization initiator. Typical examples of the organic peroxide include 1,1,3,3-tetramethylbutylperoxy-2-ethyl hexanoate, n-butyl-4,4-bis(t-butylperoxy)valerate, and 1,1-bis(t-butylperoxy)cyclohexane. However, there are no particular restrictions on the organic peroxide as long as it generates a radical by heat or light irradiation.

Further, mercaptan may be added as a chain transfer agent for adjusting the molecular weight. Typical examples of the mercaptan include octyl mercaptan, but there are no particular restrictions as long as it has a structure expressed as R—SH (where R represents an organic group).

<Material of Reflective Layer>

There are no restrictions on the material constituting the reflective layer 5 as long as it can reflect the light emitted from the side surface of the fiber with high reflectance. Among them, a metal film is preferred when a thin diameter is required as a fiber, because a high reflectance can be obtained with a smaller thickness than, for example, a white reflective paint or the like.

The metal film is not particularly limited, such as aluminum, gold, silver, and nickel, as long as the reflectance in the required wavelength range is high. Aluminum and silver are suitable because of their high reflectance in the visible light region. Further, from the viewpoint of cost, aluminum is suitable.

Note that, the thickness of the metal film is not particularly limited, and it is preferable to obtain a high reflectance with the thickness as thin as possible in the visible light region. For example, aluminum preferably has a thickness of 10 to 100 nm, more preferably 20 to 70 nm. Silver preferably has a thickness of 35 to 150 nm, more preferably 50 to 100 nm. Further, the film formation method is not particularly limited, such as a vapor deposition method and a sputtering method.

<Method for Manufacturing Plastic Scintillating Fiber>

Figure 4:
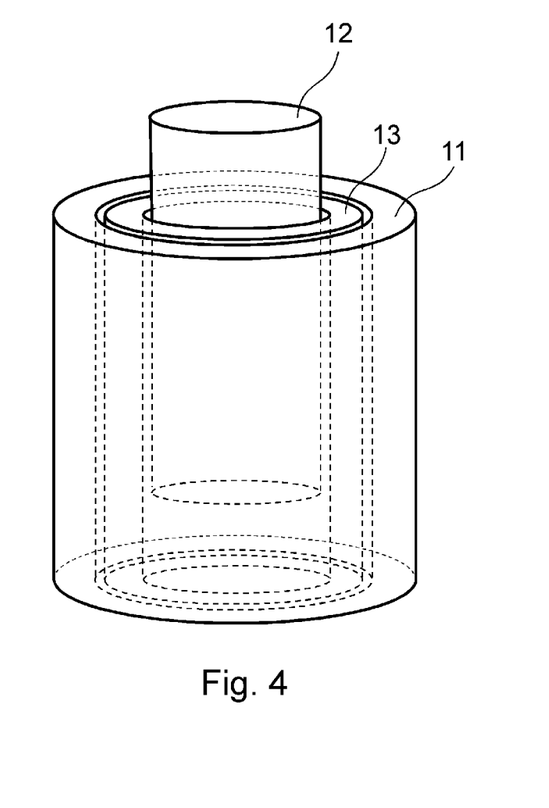
FIG. 4 is a perspective view showing a method for manufacturing a plastic scintillating fiber according to the first embodiment.

FIG. 4 is a perspective view showing a method for manufacturing a plastic scintillating fiber according to the first embodiment. FIG. 4 shows a base material (a preform) for manufacturing the plastic scintillating fiber shown in FIG. 1.

The first cylindrical body 11 is a cylindrical body made of a thermoplastic resin that emits scintillation light by neutron radiation. This thermoplastic resin contains an organic compound containing an element with a neutron cross section larger than that of hydrogen. The first cylindrical body 11 will constitute the outermost peripheral layer 1 after a drawing process. Examples of the method for manufacturing the first cylindrical body 11 will be described in Examples.

A rod 12 is a cylindrical body made of a transparent thermoplastic resin in which at least one type of fluorescent substance that absorbs scintillation light and converts the absorbed light into light having a wavelength longer than that of the absorbed light is dissolved. The rod 12 will constitute the core 2 after the drawing process.

A second cylindrical body 13 is a cylindrical body made of a transparent thermoplastic resin having a refractive index lower than that of the rod 12. The second cylindrical body 13 will constitute the cladding layer 3 after the drawing process.

As shown in FIG. 4, a preform is manufactured by inserting the second cylindrical body 13 into the first cylindrical body 11 and inserting the rod 12 into the second cylindrical body 13. FIG. 4 shows a state in which the rod 12 is in the process of being inserted into the second cylindrical body 13. A plastic scintillating fiber according to the first embodiment is obtained by, while heating the tip of the manufactured preform, drawing the preform into, for example, a thread having an outer diameter of 1 mm.

Note that although a gap is formed between the first cylindrical body 11 and the second cylindrical body 13, and between the second cylindrical body 13 and the rod 12 as shown in FIG. 4, the core 2, the cladding layer 3, and the outermost peripheral layer 1 are integrally formed while being tightly in contact with each other because the drawing process is performed under a reduced-pressure.

The plastic scintillating fiber according to the modified example shown in FIG. 3 can also be manufactured by a similar manufacturing method.

In the method for manufacturing a plastic scintillating fiber according to the first embodiment, a scintillator layer (the outermost peripheral layer 1), which emits light by neutron radiation, is integrally formed on the outer peripheral surface of the wavelength shifting fiber (the core 2 and the cladding layer 3). Therefore, the plastic scintillating fiber is capable of detecting neutron radiation as well as capable of transmitting light. That is, the plastic scintillating fiber has, by itself, both the function as a conventional scintillator and the function as a wavelength shifting fiber.

Therefore, there is no need for the post-processing, which is required to combine the scintillator and the wavelength shifting fiber in the conventional technology. Therefore, the productivity is significantly improved and the costs is reduced as compared to the conventional technology. In particular, in the case of image detection, there is no need to separate and combine scintillators one by one for each of wavelength shifting fibers. That is, all that has to be done is to arrange (e.g., line up) plastic scintillating fibers. Therefore, the productivity is significantly improved and the costs are reduced as compared to the conventional technology.

Note that after manufacturing the wavelength shifting fiber (the core 2 and the cladding layer 3), the scintillator layer (the outermost peripheral layer 1) may be integrally formed by a coating process (including a painting process) on the surface of the wavelength shifting fiber. However, as described above, if the scintillator layer (outermost peripheral layer 1) and the wavelength shifting fiber (core 2 and cladding layer 3) are simultaneously manufactured by a drawing process, productivity is further improved.

<Application Example of Plastic Scintillating Fiber>

Figure 5:
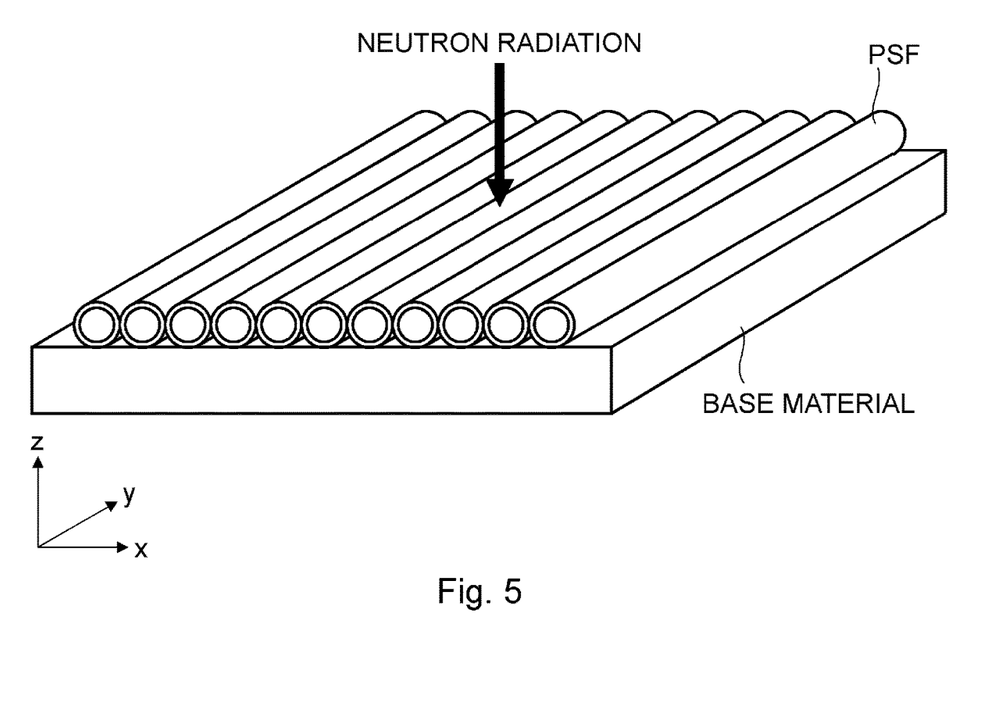
FIG. 5 is a perspective view showing an example in which scintillating fibers according to the first embodiment are applied.

Next, an example in which the plastic scintillating fiber according to the first embodiment is applied will be described with reference to FIG. 5. FIG. 5 is a perspective view showing an example in which plastic scintillating fibers according to the first embodiment are applied. In this application example, the plastic scintillating fibers PSFs according to the first embodiment is arranged in an array on a substrate.

Note that, needless to say, a right-handed xyz-orthogonal coordinate system shown in FIG. 5 is shown just for the sake of convenience for explaining the positional relation among components. In general, the z-axis positive direction is vertically upward and the xy-plane is parallel to the horizontal plane.

Each of the plastic scintillating fibers PSFs is connected to a photoelectric detector such as a photomultiplier tube (not shown), so it can detect transmitted light. By the above-described configuration, it is possible to perform, for example, one-dimensional image detection (position detection) with a resolution of 1 mm. Note that the resolution is equal to the diameter of each of the plastic scintillating fibers PSFs. Further, by preparing two arrays of such plastic scintillating fibers PSFs and stacking them on top of each other in such a manner that they are perpendicular to each other, it is also possible to perform two-dimensional image detection.

In this way, it is also possible to, by using plastic scintillating fibers according to this embodiment, easily perform image detection of neutron radiation with a high spatial resolution at low costs.

EXAMPLES

The present invention will be described hereinafter in a more detailed manner by using examples, but is not limited by those examples at all.

Example 1 m-Carborane, which is an organic compound containing boron 10 of which a neutron cross section is larger than that of hydrogen, of 5 mass %, and 1 mass % of fluorescent substance 2-(4-t-butylphenyl)-5-(4-biphenyl)-1,3,4-oxadiazole (b-PBD) were added to a styrene monomer, the mixture was polymerized, and the resulting polymer was formed into a cylindrical body for an outermost peripheral layer (first cylindrical body 11 in FIG. 4) having an outer diameter of 50 mm and an inner diameter of 40 mm.

A rod for a core having a diameter of 32 mm, made of polystyrene (having a refractive index 1.59) (i.e., the rod 12 in FIG. 4) and a cylindrical body for a cladding layer having an outer diameter of 38 mm and an inner diameter of 34 mm, made of polymethyl methacrylate (having a refractive index of 1.49) (i.e., the second cylindrical body 13 in FIG. 4) were prepared. In the rod for the core, 2,5-bis-(5-t-butyl-benzoxazoyl)thiophene (BBOT) was dissolved as a wavelength-shifting fluorescent substance at a concentration of 200 mass ppm.

As shown in FIG. 4, a preform was manufactured by inserting the cylindrical body for the cladding layer into the cylindrical body for the outermost peripheral layer and inserting the rod for the core into the cylindrical body for the cladding layer. A plastic scintillating fiber according to the Example 1 was obtained by integrally drawing, while heating the tip of the preform, the preform under a reduced pressure so that the outer diameter of the drawn thread became 1 mm. This plastic scintillating fiber had the cross-sectional structure shown in FIG. 1. The outer diameter was 1,000 μm, and the diameter of the cladding layer 3 was 770 μm. The diameter of the core 2 was 680 μm, and the thickness of the outermost peripheral layer 1 was 115 μm. Further, the thickness of the cladding layer 3 was 45 μm.

Figure 6:
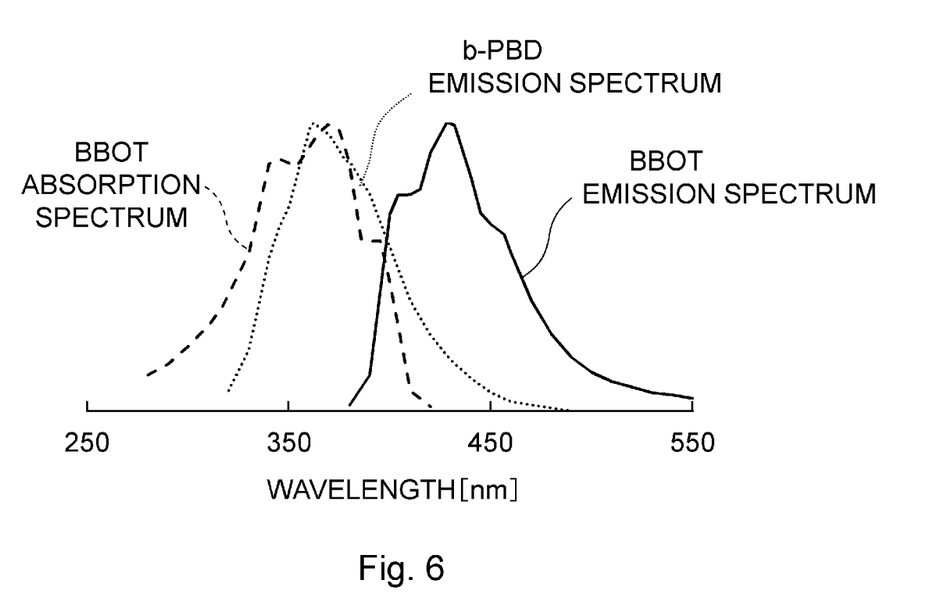
FIG. 6 shows the emission spectrum of para-terphenyl added to the outermost peripheral layer and the absorption and emission spectra of the wavelength-shifting fluorescent substance BBOT.

FIG. 6 is a graph showing the emission spectrum of fluorescent substance 2-(4-t-butylphenyl)-5-(4-biphenyl)-1,3,4-oxadiazole (b-PBD) added to the outermost peripheral layer 1 and the absorption and emission spectra of the wavelength-shifting fluorescent substance BBOT added to the core 2. As shown in FIG. 6, there is a large overlap between the emission spectrum of b-PBD added to the outermost peripheral layer 1 and the absorption spectrum of BBOT added to the core 2. Since the plastic scintillating fiber according to Example 1 contains an organic compound having a neutron cross section larger than that of hydrogen, the neutron sensitivity was improved as compared with the conventional plastic scintillating fiber.

Example 2

Similarly to the Example 1, a cylindrical body for an outermost peripheral layer having an outer diameter of 50 mm and an inner diameter of 40 mm (i.e., the first cylindrical body 11 in FIG. 4) was formed. Further, similarly to the Example 1, a rod for a core having a diameter of 28 mm, made of polystyrene (having a refractive index 1.59) (i.e., the rod 12 in FIG. 4) and a cylindrical body for a cladding layer having an outer diameter of 33 mm and an inner diameter of 30 mm, made of polymethyl methacrylate (having a refractive index of 1.49) (i.e., the second cylindrical body 13 in FIG. 4) were prepared. In the rod for the core, BBOT was dissolved as a wavelength-shifting fluorescent substance at a concentration of 300 mass ppm.

Further, in the Example 2, a cylindrical body for an outer cladding layer having an outer diameter of 38 mm and an inner diameter of 35 mm, made of a copolymer of a fluorinated monomer such as perfluoroalkyl acrylate (having a refractive index 1.42) (not shown) was prepared. The cylindrical body for the outer cladding layer will constitute the cladding layer 4 shown in FIG. 3 after the drawing process.

Then, a preform was manufactured by inserting the cylindrical body for the outer cladding layer into the cylindrical body for the outermost peripheral layer, inserting the cylindrical body for the inner cladding layer into the cylindrical body for the outer cladding layer, and inserting the rod for the core into the cylindrical body for the inner cladding layer.

A plastic scintillating fiber according to the Example 2 was obtained by integrally drawing, while heating the tip of the preform, the preform under a reduced pressure so that the outer diameter of the drawn thread became 1 mm. This plastic scintillating fiber had the cross-sectional structure shown in FIG. 3. The outer diameter was 1,000 μm, and the outer diameter of the cladding layer 4 was 754 μm. The outer diameter of the cladding layer 3 was 682 μm, and the diameter of the core 2 was 612 μm. The thickness of the outermost peripheral layer 1 was 123 μm, and the thickness of the cladding layer 4 was 36 μm. Further, the thickness of the cladding layer 3 was 35 μm.

When neutron radiation was applied to the plastic scintillating fiber according to the Example 2, quantity of light 30% higher than that in the Example 1 could be observed at the tip of the fiber 10 m away from the application point of the radiation. It is considered that although the diameter of the core 2 became smaller than that in the Example 1, the total reflection angle became wider by the provision of the cladding layer 4 having a lower refractive index, so that more intense light was obtained.

Example 3

Lithium pivalate, which is an organic compound containing lithium 6 of which a neutron cross section is larger than that of hydrogen, of 1.9 mass %, and mass % of fluorescent substance 2-(4-t-butylphenyl)-5-(4-biphenyl)-1,3,4-oxadiazole (b-PBD) were added to a styrene monomer, the mixture was polymerized, and the resulting polymer was formed into a cylindrical body for an outermost peripheral layer (first cylindrical body 11 in FIG. 4) having an outer diameter of 50 mm and an inner diameter of 40 mm.

A rod for a core having a diameter of 32 mm, made of polystyrene (having a refractive index 1.59) (i.e., the rod 12 in FIG. 4) and a cylindrical body for a cladding layer having an outer diameter of 38 mm and an inner diameter of 34 mm, made of polymethyl methacrylate (having a refractive index of 1.49) (i.e., the second cylindrical body 13 in FIG. 4) were prepared. In the rod for the core, 2,5-bis-(5-t-butyl-benzoxazoyl)thiophene (BBOT) was dissolved as a wavelength-shifting fluorescent substance at a concentration of 200 mass ppm.

As shown in FIG. 4, a preform was manufactured by inserting the cylindrical body for the cladding layer into the cylindrical body for the outermost peripheral layer and inserting the rod for the core into the cylindrical body for the cladding layer. A plastic scintillating fiber according to the Example 1 was obtained by integrally drawing, while heating the tip of the preform, the preform under a reduced pressure so that the outer diameter of the drawn thread became 1 mm. This plastic scintillating fiber had the cross-sectional structure shown in FIG. 1. The outer diameter was 1,000 μm, and the diameter of the cladding layer 3 was 770 μm. The diameter of the core 2 was 680 μm, and the thickness of the outermost peripheral layer 1 was 115 μm. Further, the thickness of the cladding layer 3 was 45 μm. Since the plastic scintillating fiber according to Example 3 contains an organic compound having a neutron cross section larger than that of hydrogen, the neutron sensitivity was improved as compared with the conventional plastic scintillating fiber.

Example 4

An aluminum film having a thickness of about 50 nm was formed on the surface of the plastic scintillating fiber according to Example 1 by a vapor deposition method.

The scintillation light emitted in the outermost peripheral layer 1 and the light whose wavelength had been shifted in the core 2 were reflected in the reflective layer 5 to be unlikely to leak outside from the side surface of the fiber, resulting in intense light.

The present invention is not limited to the above-described embodiments, and they may be modified as desired without departing from the scope and spirit of the present invention.

REFERENCE SIGNS LIST

1 OUTERMOST PERIPHERAL LAYER
2 CORE
3 CLADDING LAYER (INNER CLADDING LAYER)
4 CLADDING LAYER (OUTER CLADDING LAYER)
5 REFLECTIVE LAYER
11 FIRST CYLINDRICAL BODY
12 ROD
13 SECOND CYLINDRICAL BODY
PSF PLASTIC SCINTILLATING FIBER

The invention claimed is:
1. A plastic scintillating fiber, comprising:
an outer peripheral layer containing a plastic material that contains:
  an organic compound containing an element with a neutron cross section larger than that of hydrogen and that emits scintillation light when it is irradiated with neutron radiation, and
  at least one type of a first fluorescent substance that absorbs the scintillation light and wavelength-converts the absorbed scintillation light into a first light having a wavelength longer than that of the scintillation light;
a core having a high refractive index, disposed inside the outer peripheral layer, and containing at least one type of a second fluorescent substance that absorbs the first light emitted from the first fluorescent substance and wavelength-converts the absorbed first light into light having a wavelength longer than that of the absorbed first light; and
a cladding layer covering an outer peripheral surface of the core and having a refractive index lower than that of the core,
wherein a wavelength shifting fiber including the core and the cladding layer, and the outer peripheral layer covering an outer peripheral surface of the wavelength shifting fiber are integrally formed;
the scintillation light is ultraviolet light having a wavelength of 250 to 350 nm, and
the light emitted from the second fluorescent substance has a wavelength of 350 to 600 nm.
2. The plastic scintillating fiber according to claim 1, wherein the organic compound includes lithium 6.

3. The plastic scintillating fiber according to claim 1, wherein the organic compound includes boron 10.

4. The plastic scintillating fiber according to claim 3, wherein the organic compound is a carborane-based compound.

5. The plastic scintillating fiber according to claim 3, wherein a ratio of boron in a molecular weight of the organic compound is 50% or more.

6. The plastic scintillating fiber according to claim 1, wherein the organic compound includes gadolinium.

7. The plastic scintillating fiber according to claim 1, wherein the wavelength shifting fiber and the outer peripheral layer are integrally formed by a drawing process.

8. The plastic scintillating fiber according to claim 1, wherein outside the outer peripheral layer, a protective layer that protects the outer peripheral layer is integrally formed.

9. The plastic scintillating fiber according to claim 1, wherein the cladding layer has a multi-cladding structure comprising:
 an inner cladding layer; and
 an outer cladding layer covering an outer peripheral surface of the inner cladding layer and having a refractive index lower than that of the inner cladding layer.

10. The plastic scintillating fiber according to claim 1, comprising a reflective layer outside the outer peripheral layer.

11. The plastic scintillating fiber according to claim 10, wherein the reflective layer is a metal film.

12. A method for manufacturing a plastic scintillating fiber, the plastic scintillating fiber comprising:
 an outer peripheral layer containing a plastic material that contains:
  an organic compound containing an element with a neutron cross section larger than that of hydrogen and that emits scintillation light when it is irradiated with neutron radiation, and
  at least one type of a first fluorescent substance that absorbs the scintillation light and wavelength-converts the absorbed scintillation light into a first light having a wavelength longer than that of the scintillation light;
 a core having a high refractive index, disposed inside the outer peripheral layer, and containing at least one type of a second fluorescent substance that absorbs the first light emitted from the first fluorescent substance and wavelength-converts the absorbed first light into light having a wavelength longer than that of the absorbed first light; and
 a cladding layer covering an outer peripheral surface of the core and having a refractive index lower than that of the core,
the method comprising:
 manufacturing a preform by inserting a second cylindrical body for the cladding layer into a first cylindrical body for the outer peripheral layer, and inserting a rod for the core into the second cylindrical body; and
 drawing the preform while heating the preform;
 wherein the scintillation light is ultraviolet light having a wavelength of 250 to 350 nm, and
 the light emitted from the second fluorescent substance has a wavelength of 350 to 600 nm.

13. A method for manufacturing a plastic scintillating fiber, the plastic scintillating fiber comprising:
 an outer peripheral layer containing a plastic material that contains:
  an organic compound containing an element with a neutron cross section larger than that of hydrogen and that emits scintillation light when it is irradiated with neutron radiation, and
  at least one type of a first fluorescent substance that absorbs the scintillation light and wavelength-converts the absorbed scintillation light into a first light having a wavelength longer than that of the scintillation light;
 a core having a high refractive index, disposed inside the outer peripheral layer, and containing at least one type of a second fluorescent substance that absorbs the first light emitted from the first fluorescent substance and wavelength-converts the absorbed first light into light having a wavelength longer than that of the absorbed first light; and
 a cladding layer covering an outer peripheral surface of the core and having a refractive index lower than that of the core,
the method comprising:
 coating the outer peripheral layer on a surface of a wavelength shifting fiber containing the core and the cladding layer, wherein
 the scintillation light is ultraviolet light having a wavelength of 250 to 350 nm, and the light emitted from the second fluorescent substance has a wavelength of 350 to 600 nm.

* * * * *